(12) United States Patent
Movassaghi et al.

(10) Patent No.: US 8,768,166 B2
(45) Date of Patent: Jul. 1, 2014

(54) ADAPTIVE SETTING OF TRANSMIT POWER IN OPTICAL TRANSCEIVERS

(75) Inventors: Mahan Movassaghi, Santa Clara, CA (US); Norman Tang, Los Altos, CA (US); Liang Ping Peng, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 13/087,563

(22) Filed: Apr. 15, 2011

(65) Prior Publication Data

US 2012/0263460 A1 Oct. 18, 2012

(51) Int. Cl.
*H04B 17/00* (2006.01)

(52) U.S. Cl.
USPC .............. 398/38; 398/197; 398/137; 398/139; 398/162; 398/189

(58) Field of Classification Search
None
See application file for complete search history.

(56) References Cited

U.S. PATENT DOCUMENTS

| | | | |
|---|---|---|---|
| 5,040,242 A * | 8/1991 | Tsuchiya et al. | 398/116 |
| 6,366,380 B1 | 4/2002 | Chesavage | |
| 6,643,467 B1 * | 11/2003 | Presby et al. | 398/120 |
| 7,447,440 B2 | 11/2008 | Theodoras, II | |
| 7,731,432 B2 | 6/2010 | Theodoras, II et al. | |
| 2003/0113118 A1 * | 6/2003 | Bartur | 398/139 |
| 2005/0031357 A1 * | 2/2005 | Soto et al. | 398/198 |
| 2006/0120720 A1 * | 6/2006 | Hauenschild et al. | 398/38 |
| 2007/0071450 A1 * | 3/2007 | Schatz et al. | 398/162 |
| 2007/0237523 A1 * | 10/2007 | Miguel et al. | 398/71 |

OTHER PUBLICATIONS

Wayback Machine—Wikipedia, Pulse-width modulation [online], crawled on Jan. 18, 2005, retrieved on Aug. 9, 2013, Retrieved from <URL: http://web.archive.org/web/20050118184106/http://en.wikipedia.org/wiki/Pulse-width_modulation>, 2 pages.*

* cited by examiner

*Primary Examiner* — Ken Vanderpuye
*Assistant Examiner* — David Lambert
(74) *Attorney, Agent, or Firm* — Edell, Shapiro & Finnan, LLC

(57) ABSTRACT

Adaptive power setting techniques for optical transceivers are provided. Optical signals are received at a first optical transceiver device that are transmitted from a second optical transceiver device. A receive power of the optical signals received at the first optical transceiver device from the second optical transceiver device is determined. A characteristic of optical signals transmitted by the first optical transceiver device to the second optical transceiver device is modulated to indicate to the second optical transceiver device a disparity of the receive power with respect to a target receive power level at the first optical transceiver device. Conversely, the first optical transceiver device adjusts a power level of optical signals transmitted by the first optical transceiver device to the second optical transceiver device based on a characteristic of the optical signals received at the first optical transceiver device.

16 Claims, 6 Drawing Sheets

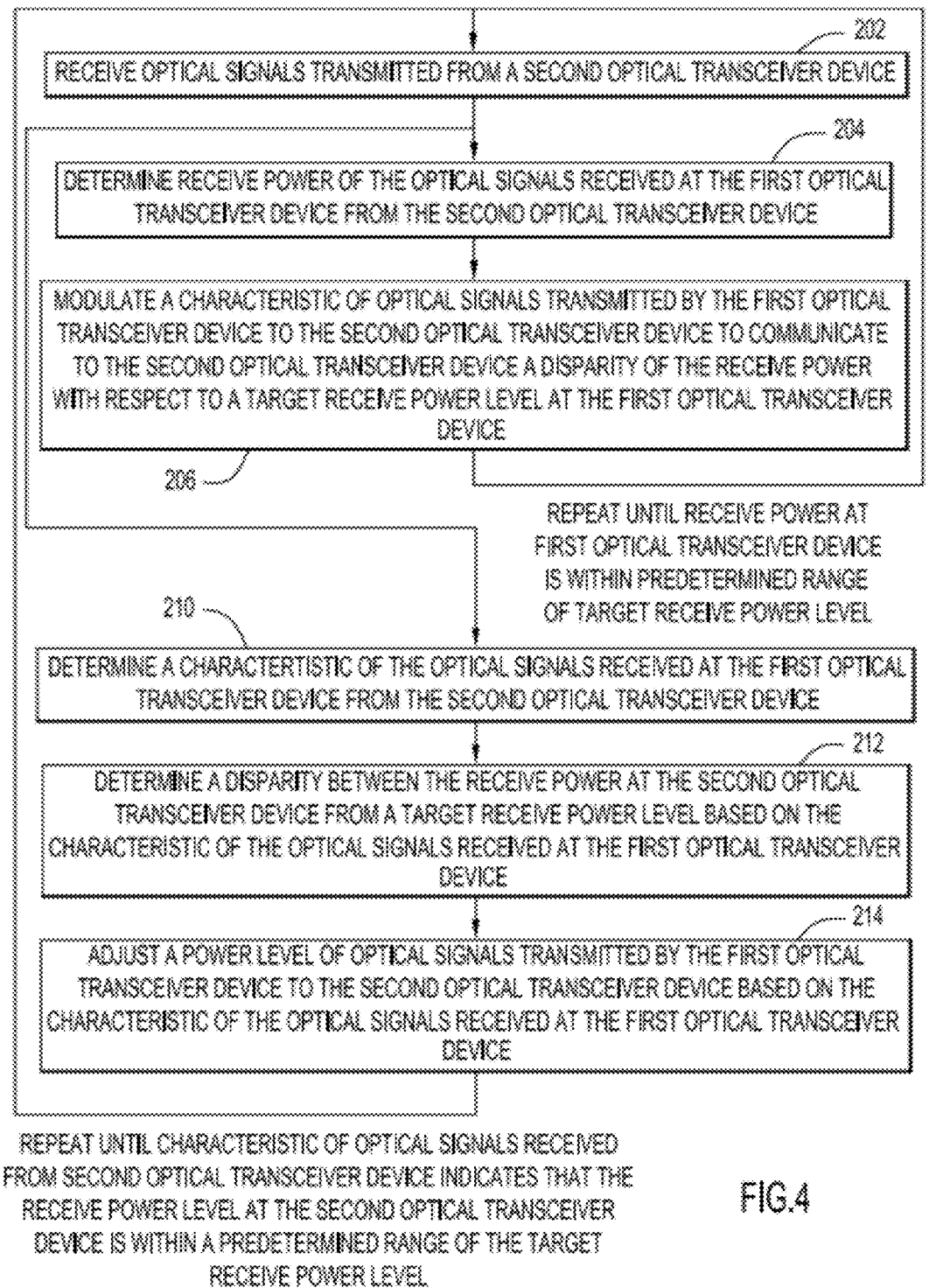

ADAPTIVE SETTING OF TRANSMIT POWER IN OPTICAL TRANSCEIVERS

TECHNICAL FIELD

The present disclosure relates to optical transceivers.

BACKGROUND

In current optical transceivers, the transmit power of the laser transmitter is set at a fixed value between a minimum and a maximum. This fixed power setting can cause complications during installation and testing of the optical transceivers. As an example, for one type of optical transceiver, the transmit power range is between 0 and 4 dBm, and this range includes power much higher than a maximum receive power of −7 dBm. As a result, an optical attenuator needs to be inserted in the path between two optical transceivers if the optical fiber loss between the two optical transceivers is not high enough to result in the receive power being lower than −7 dBm.

Also, the amount of attenuation needed depends on the fiber loss and this requires characterization of the installed fiber before a link can be turned on. This is an additional task and requires test equipment not readily available in the field. Further still, a common practice in the field for debugging link problems is a loop back test whereby technicians put a jumper cable between the transmitter and receiver of an optical transceiver module to assure proper operation. In doing so, when an attenuator is not used and the transmitter power is at a higher power setting than the maximum receiver power, the optical transceiver module does not operate properly and in some cases the receiver can be permanently damaged.

BRIEF DESCRIPTION OF THE DRAWINGS

FIG. 4 is a flow chart that generally depicts operations of the adaptive power setting procedure.

DESCRIPTION OF EXAMPLE EMBODIMENTS

Overview

Adaptive power setting techniques for optical transceivers are provided. Optical signals are received at a first optical transceiver device that are transmitted from a second optical transceiver device. A receive power of the optical signals received at the first optical transceiver device from the second optical transceiver device is determined. A characteristic of optical signals transmitted by the first optical transceiver device to the second optical transceiver device is modulated to indicate to the second optical transceiver device a disparity of the receive power with respect to a target receive power level at the first optical transceiver device. Conversely, the first optical transceiver device determines a characteristic of the optical signals received from the second optical transceiver device and uses that to determine a disparity between the receive power at the second optical transceiver device and a target receive power level. The first optical transceiver device adjusts a power level of optical signals transmitted by the first optical transceiver device to the second optical transceiver device based on the disparity between the receive power at the second optical transceiver and a target receive power level.

Example Embodiments

Figure 1:
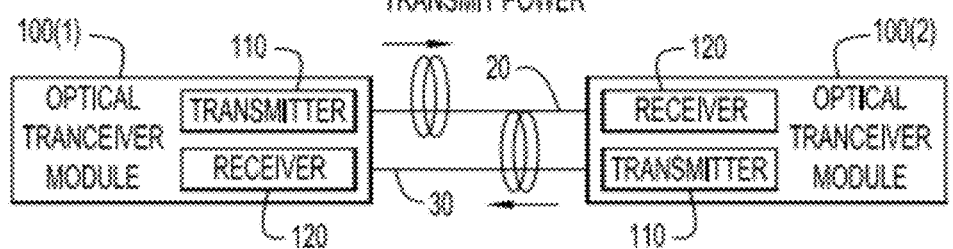
FIG. 1 is a block diagram showing an example of a system comprising first and second optical transceiver modules, at least one of which is configured to perform an adaptive power setting procedure.

Referring first to FIG. 1, a system 10 is shown comprising first and second optical transceivers 100(1) and 100(2) that are coupled by two optical fibers 20 and 30. The optical transceivers 100(1) and 100(2) are also referred to as optical transceiver modules and optical transceiver devices. In addition, the optical transceiver 100(2) is referred to as a partner optical transceiver with respect to optical transceiver 100(1). Similarly, the optical transceiver 100(1) is referred to as a partner optical transceiver with respect to optical transceiver 100(2).

Each optical transceiver 100(1) and 100(2) comprises an optical transmitter (e.g., a laser) 110 and an optical receiver 120, e.g., a photodiode. Optical fiber 20 is coupled between the transmitter 110 of optical transceiver module 100(1) and the receiver 120 of optical transceiver module 100(2). Likewise, optical fiber 30 is coupled between the transmitter 110 of optical transceiver module 100(2) and the receiver 120 of optical transceiver module 100(1).

In current optical transceiver designs, the transmit power of the transmitter 110 is set at a fixed value. According to the techniques described herein, an adaptive transmit power setting algorithm is provided to set the transmit power of an optical transceiver module. At least one (e.g., a first) of the optical transceiver modules on a fiber optic link is configured to communicate, during startup of the device, with the other (e.g., a second) optical transceiver module on the link using a characteristic of optical signals that the first optical transceiver module transmits to the second optical transceiver module in order to communicate the first optical transceiver module's receive power level disparity from a target level and thereby allow the second optical transceiver module to adjust its transmit power to reduce the receiver power disparity and eventually bring the receiver power level of the first optical transceiver to within a target range after one or more iterations. The second optical transceiver may be performing the same operations with respect to the receive power for optical signals received from the first optical transceiver. As a result, the first optical receiver determines a characteristic of the optical signals it receives from the second optical transceiver device and adjusts a power level of optical signals transmitted by the first optical transceiver device to the second optical transceiver device based on the characteristic of the optical signals received at the first optical transceiver device. The same operations are performed at the second optical transceiver module assuming it is equipped to perform the adaptive power setting algorithm.

The adaptive transmit power setting techniques involve an optical transceiver module communicating the receive power level to its partner (the other optical transceiver module that is communicating with) by modulating at least one characteristic of the optical signals. An example of a characteristic is pulse width modulation (PWM) of the optical signals. In one particular example described herein, the duty cycle of transmitted optical signals is modulated at a constant relatively low frequency (e.g., 1 kHz) by changing the transmit bias current (or voltage) with different pulse widths. The resulting changes in duty cycle of the transmitted optical signals indicate a different receive power at particular point in time in the process. In one example, the modulation frequency is low enough such that it is well below the 3 dB cutoff frequency of the RX power monitor at the partner optical transceiver module in the event that a lower modulation frequency is needed due to the capabilities of the RX power monitor. However, modulating the pulse widths at a relatively low frequency is not a requirement.

When a first optical transceiver module transmits optical signals with a characteristic, e.g., a duty cycle, having a first value, e.g., 90%, this means that the receive power at the first optical transceiver module is within a predetermined range of the target receive power level. When the duty cycle has a second value, e.g., 85%, this means that the receive power at the first optical transceiver module with respect to optical signals received from the second optical transceiver module is below the target receive power level. A characteristic of the transmit signals, e.g., duty cycle having a third value, such as 95%, means that the receive power at the first optical transceiver module is above the target receive power level. Accordingly, the transmit bias current or voltage (which directly affects the transmit output power) of an optical transceiver module is adaptively adjusted until the receive power of its partner optical transceiver module is in the desired range.

Figure 2:
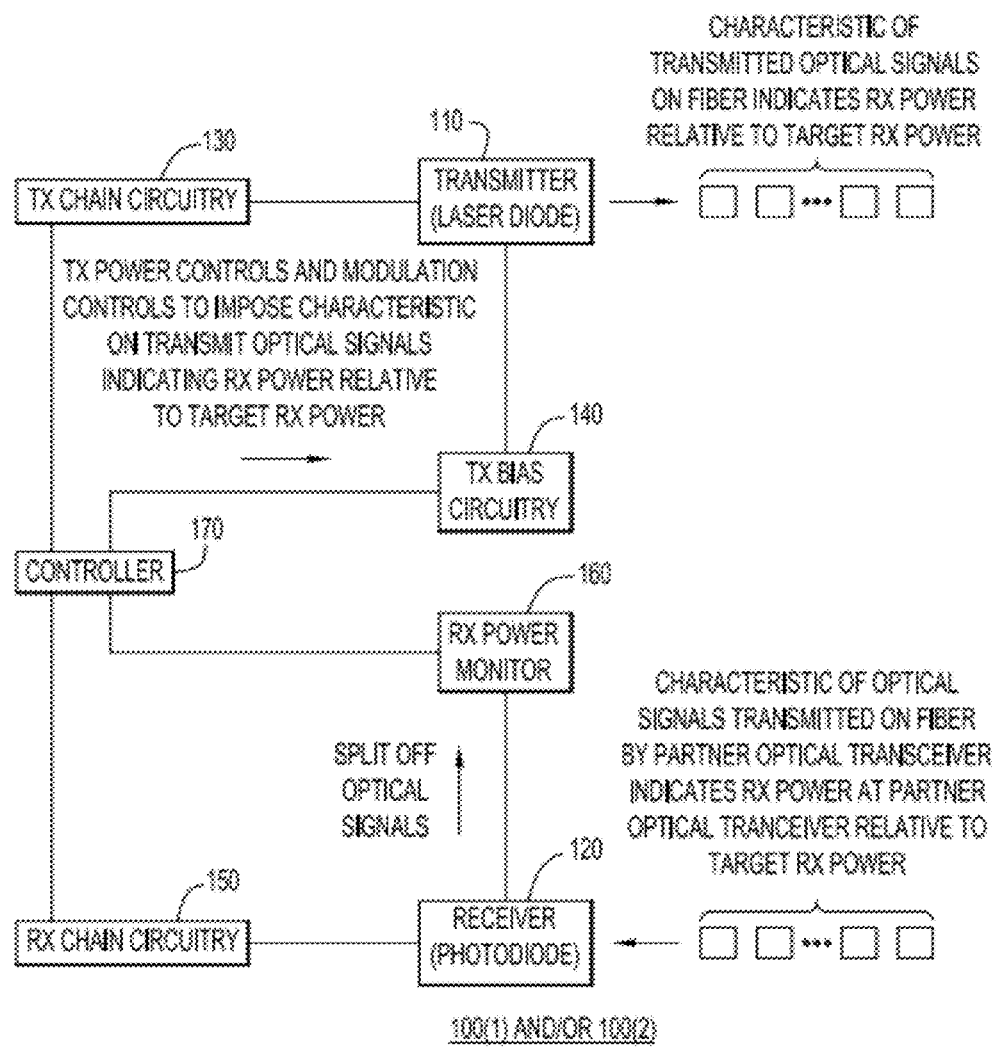
FIG. 2 is a block diagram of an example of an optical transceiver module configured to perform the adaptive power setting procedure.

Reference is now made to FIG. 2 that illustrates an example of a block diagram for an optical transceiver module configured to perform the adaptive power control techniques described herein. The optical transceiver module shown in FIG. 2 is representative of the optical transceiver 100(1) or 100(2) shown in FIG. 1. FIG. 2 shows the optical transmitter 110 and optical receiver 120. The optical transceiver module also comprises transmit (TX) chain circuitry 130, TX bias circuitry 140, receive (RX) chain circuitry 150, an RX power monitor unit 160 and a controller 170.

The transmitter 110 is, for example, a laser diode. The TX chain circuitry 130 is a block of circuitry used to modulate the data for conversion to optical signals by the transmitter 110. For these reasons, the TX chain circuitry 130 may be viewed as a modulator. The details of the TX chain circuitry 130 are not relevant to the adaptive power control techniques and are therefore not described herein. The TX bias circuitry 140 comprises circuitry configured to provide bias current (or voltage) to the transmitter 110 to control the power of the optical signals output by the transmitter 110 into an optical fiber. The TX bias circuitry 140 can adjust the power level of optical signals transmitted by the transmitter 110 as well as at least one other characteristic, e.g., duty cycle, pulse width, pulse frequency, of the optical signals that are transmitted by the transmitter 110.

The receiver 120 is, for example, a high speed photodiode or avalanche diode, and it converts received optical signals from an optical fiber to an electrical signal. In one form, as shown in FIG. 2, an optical splitter, that can be considered as part of the receiver 120 or as a separate device, is provided to split out the received optical signal from the fiber to the RX power monitor 160. In this form, the RX power monitor 160 is a circuit that converts relatively low speed pulse width modulated optical signals to electrical signals comprising a train of pulses whose level and width tracks the power and pulse width of the received modulated optical signals. The RX power monitor 160 has a relatively low bandwidth so that a modulation imposed on the optical signals that is greater than a certain frequency, e.g., 1 kHz, is not detectable by the RX power monitor 160. Thus, the relatively low frequency modulation imposed on the optical signals during power up is used by the partner optical transceiver device to encode information about its receive optical power. This is only an example and not meant to be limiting.

In another form, a splitter is not employed and instead the electrical signals output from the receiver 120 are supplied to the RX power monitor 160. In this case, the RX power monitor 160 is an electrical circuit that operates on electrical signals output by the receiver 120 to detect lower frequency changes in the received optical signals for purposes of producing the train of pulses whose level and width tracks the power and pulse width of the received modulated optical signals.

Whether the RX power monitor operates on received optical signals or on electrical signals, the controller 170 determines the receive optical power from the voltage level of the pulses of the electrical signals output by the RX power monitor 160 and determines the duty cycle from the pulse frequency and pulse widths of the electrical signal output by the RX power monitor 160. Thus, the controller 170 determines receive optical power and other characteristics, such as duty cycle of the received PWM-modulated optical signals.

By contrast, the RX chain circuitry 150 is capable of detecting high speed (relatively high frequency) changes in the received optical signals that are associated with modulated data sent from the partner optical transceiver device. The RX chain circuitry 150 processes the received high speed signal from the receiver 120 and demodulates the electrical signals to recover the data contained therein. The details of the RX chain circuitry 150 are not relevant to the adaptive power control techniques and are therefore not described herein.

The controller 170 is coupled to the TX chain circuitry 130, TX bias circuitry 140, RX chain circuitry 150 and RX power monitor 160. The controller 170 is the control point for the optical transceiver module. It sets the TX bias current or voltage that in turn controls the transmit power of the transmitter 110. The controller 170 also reads the electrical signals output by the RX power monitor 160 and from that determines the RX power and duty cycle of PWM received optical signal, and turns on/off voltage supplies to the TX chain circuitry 130 and RX chain circuitry 150. Furthermore, the controller 170 supplies a control signal to the TX bias circuitry 140 to impose a value of a characteristic on the transmitted optical signals to convey a disparity, if any, of the receive power with respect to a target receive power level as described herein. For example, the controller 170 supplies a control signal to the TX bias circuitry 140 to modulate the TX bias current with different pulse widths to communicate to the partner optical transceiver module, from the duty cycle of the transmitted optical signals, the gap or disparity between its receive power and the target receive power level to the partner optical transceiver device. The control signal that the controller 170 supplies to the TX bias circuitry 140 may comprise a train of "1's" and "0's" to modulate the optical signal with different pulse widths in order to achieve a desired power duty cycle. The TX bias circuitry 140 modulates or turns on and off the bias current to the transmitter 110 according to the train of "1's" and "0's" received from the controller 170. Also, the controller 170 determines the duty cycle of received power from the output of the RX power monitor as described above, and identifies a disparity or gap between the partner port RX power and the target receive power level and uses the disparity to adjust the transmit power until the RX power at the partner optical transceiver module is within a target receive power range.

The adaptive power setting techniques described herein can be implemented with the hardware components that already exist in a typical optical transceiver and therefore there is no additional hardware cost for implementing these techniques. FIG. 2 also shows that during the startup state of the optical transceiver module (initial boot up, re-boot, etc.), the controller 170 generates TX power controls to adjust the power level of transmitter 110 and modulation controls that are supplied to the TX bias circuitry 140 to impose the characteristic, e.g., duty cycle, on the transmitted optical signals that indicates the receive power of the optical transceiver module relative to a target receive power level. The characteristic imposed on the transmitted optical signals serves as a code that is interpreted at the partner optical transceiver module. The characteristic imposed on the transmitted optical signals may take on one of several values. Conversely, a characteristic of optical signals transmitted by the partner optical transceiver indicate receive power at the partner optical transceiver relative to a target receive power level.

Figure 3:
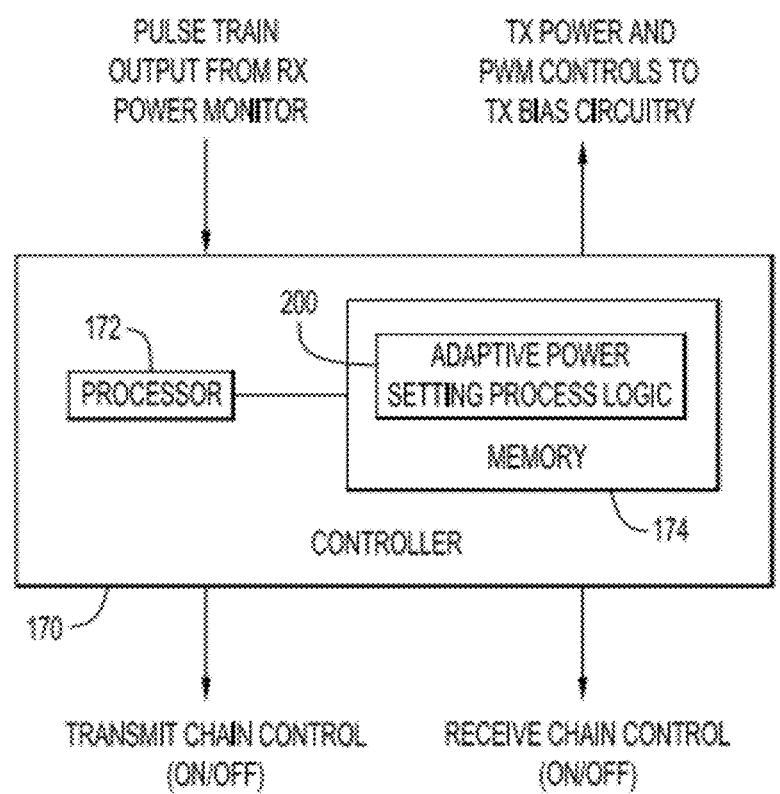
FIG. 3 is a block diagram showing an example of a controller in an optical transceiver module that is configured to perform the adaptive power setting procedure.

Reference is now made to FIG. 3. FIG. 3 shows an example of a block diagram of the controller 170. In one form, the controller 170 is a microcontroller or microprocessor that is programmed with processor executable software instructions. To this end, the controller 170 comprises a processor 172 and a memory 174 that stores software instructions for adaptive power setting process logic 200. The memory 174 is a memory device and may comprise random access memory (RAM), read only memory (ROM), flash memory devices, electrical, optical, or other physical/tangible memory storage devices. In general, the memory 174 may comprise one or more computer readable storage media (e.g., a memory device) encoded with software comprising computer executable instructions and when the software is executed (by the processor 172) it is operable to perform the operations described herein in connection with adaptive power setting process logic 200. In another form, the controller 170 is implemented in hardware, such as digital logic gates in an application specific integrated circuit (ASIC). Thus, the operations of the adaptive power setting process logic 200 may be implemented in hardware or software.

FIG. 3 also shows the basic inputs and outputs of the controller 170 as they pertain to the adaptive power setting process logic 200. The input to the controller 170 is the electrical signals (pulse train) from the RX power monitor unit 160. The output of the controller 170 includes transmit chain control (on/off) and receive chain control (on/off) signals, and TX power level and modulation controls to the TX bias circuitry 140.

Figure 5A:
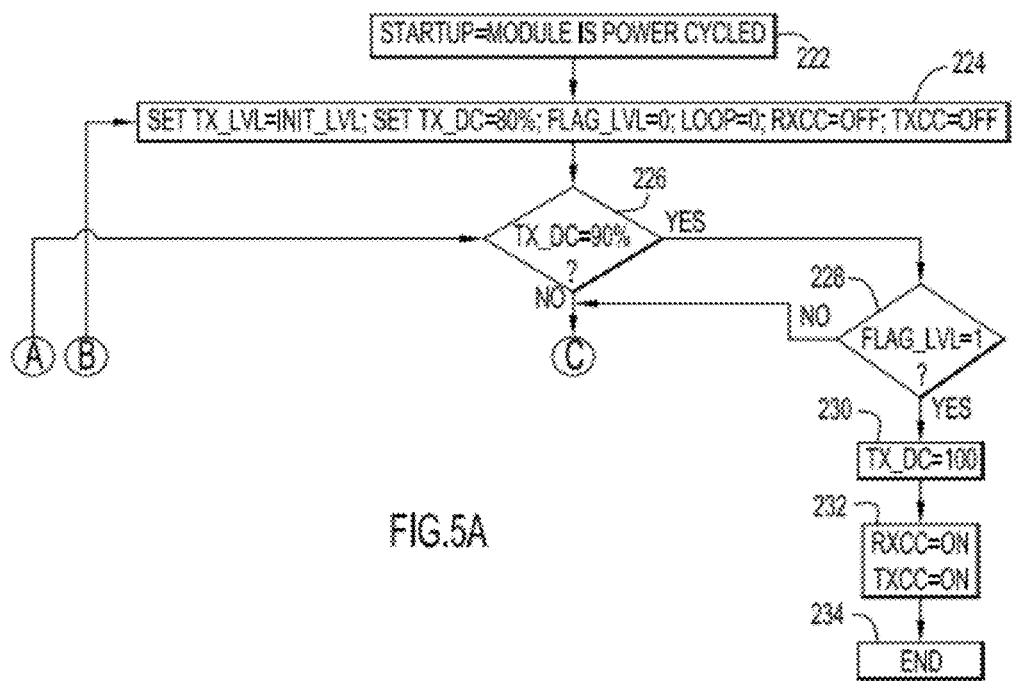
FIGS. 5A and 5B depict a flow chart for a specific example of operations of the adaptive power setting procedure.
Figure 5B:
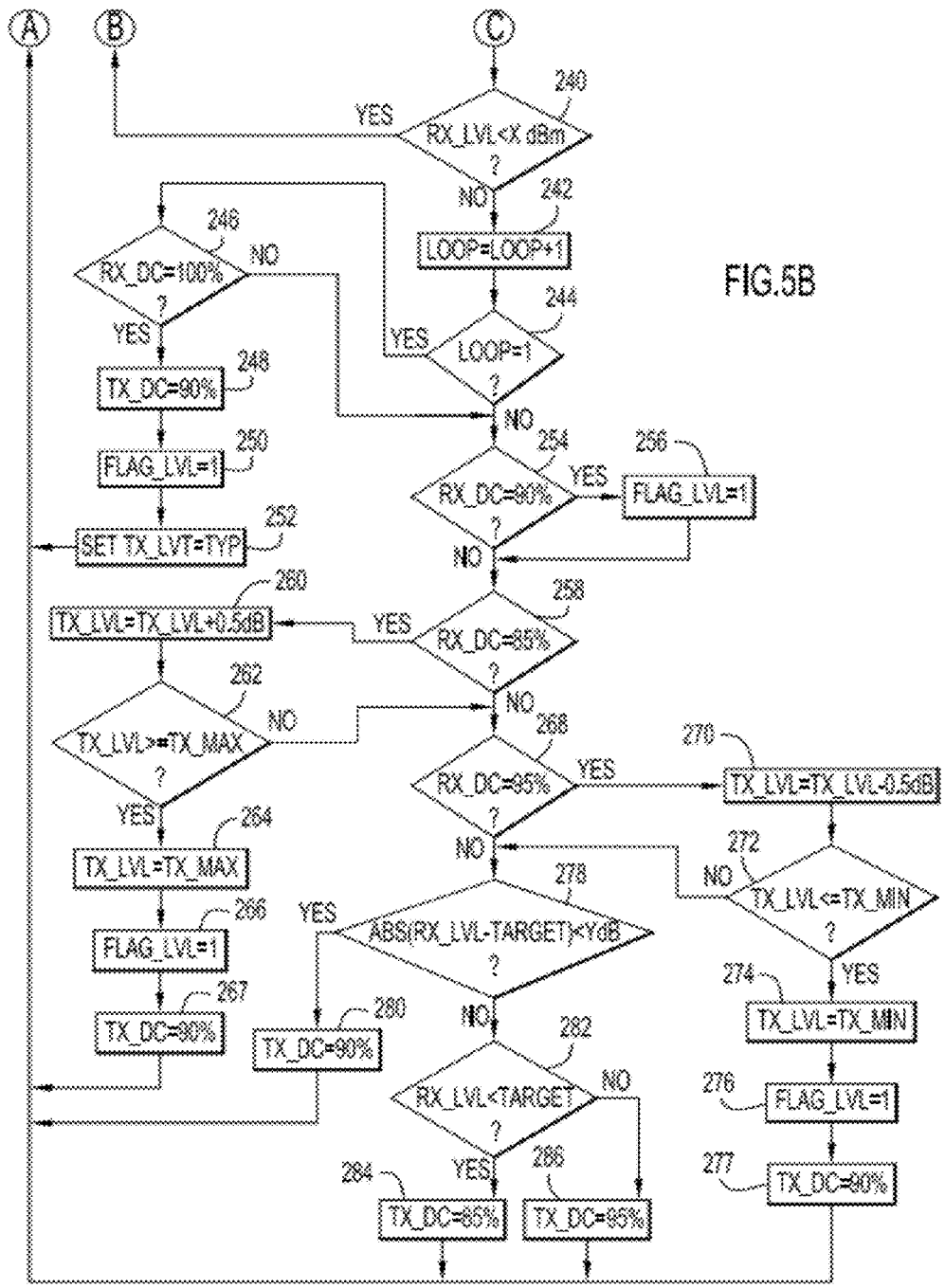

Reference is now made to FIG. 4. FIG. 4 shows a flow chart that generally depicts the operations of the adaptive power setting process logic 200. FIGS. 5A and 5B provide a more detailed flow chart for a particular example of the adaptive power setting process logic 200.

With reference first to FIG. 4, operations 202, 204 and 206 are performed at a first optical transceiver device with respect to optical signals received from a second optical transceiver device (a partner optical transceiver with respect to the first optical transceiver). At 202, optical signals transmitted from a second optical transceiver device are received at the first optical transceiver device. At 204, the receive power level of the optical signals received at the first optical transceiver device from the second optical transceiver device is determined. At 206, the first optical transceiver device modulates a characteristic of optical signals that it transmits to the second optical transceiver device to indicate/communicate to the second optical transceiver device a disparity of the receive power level with respect to a target receive power level at the first optical transceiver. Thus, operation 206 involves comparing the receive power with respect to a target receive power level at the first optical transceiver device to determine the disparity. In one example, operation 206 involves modulating the characteristic, e.g., pulse widths, of the optical signals transmitted by the first optical transceiver device to impose different values of duty cycles based on the disparity of the receive power with respect to the target receive power level, wherein a first value of the characteristic indicates that the receive power is within a predetermined amount of the target receive power level, a second value of the characteristic indicates that the receive power is below the target receive power level and a third value of the characteristic indicates that the receive power is above the target receive power level. Operations 202, 204 and 206 are repeated until receive power at the first optical transceiver device is within a predetermined range of a target receive power level, as indicated in FIG. 4.

Operations 210, 212 and 214 are operations that minor operations 202, 204 and 206, in that they are intended to determine a characteristic of inbound transmitted optical signals that indicate the receive power at the second optical transceiver device with respect to optical signals received from the first optical transceiver device. At operation 210, a characteristic, e.g., duty cycle, of the optical signals received at the first optical transceiver device from the second optical transceiver device is determined. Also at 210, it is determined whether the characteristic of the optical signals received from the second optical transceiver device indicates that the second optical transceiver device is not capable of participating in the adaptive power setting process. In this case, the power level to be used by the transmitter of the first optical transceiver device is set to a default power level.

At 212, a disparity between the receive power at the second optical transceiver device and a target receive power level is determined based on the characteristic (determined at 210) of the optical signals received at the first optical transceiver device. In one example, determining the disparity between the receive power at the second optical transceiver device and the target receive power level involves determining a value of the characteristic of the optical signals received at the first optical transceiver device from the second optical transceiver device such that a first value of the characteristic indicates that the receive power at the second optical transceiver module is within a predetermined amount of the target receive power level, a second value of the characteristic indicates that the receive power at the second optical transceiver module is below the target receive power level and a third value of the characteristic indicates that the receive power at the second optical transceiver module is above the target receive power level.

At 214, the power level of optical signals transmitted by the first optical transceiver device to the second optical transceiver device is adjusted based on the characteristic of the optical signals received at the first optical transceiver device. For example, the power level of optical signals transmitted from the first optical transceiver device is increased when the characteristic of the received optical signals from the second optical transceiver device has the second value and the power level is reduced when the characteristic of the received optical signals from the second optical transceiver device has the third value. The controller 170 in the first optical transceiver device supplies control signals to the TX bias circuitry 140 to increase the power level when the characteristic of the received optical signals from the second optical transceiver device has the second value and supplies control signals to the transmit bias circuitry to reduce the power level when the characteristic of the received optical signals from the second optical transceiver device has the third value.

Ultimately, when the characteristic of the received optical signals from the second optical transceiver device has the first value (indicating that the receive power level at the second optical transceiver device is within a predetermined range of the target receive power), the transmit power level at the first optical transceiver is locked to the current power level. Operations 210, 212 and 214 are repeated until the characteristic of the optical signals received from the second optical transceiver device indicates that the receive power level at the second optical transceiver device is within a predetermined range of the target receive power level. The operations 202-214 shown in FIG. 4 are performed after power up of the first optical transceiver device (and second optical transceiver device) but prior to normal optical communications (of traffic) with the second optical transceiver device.

The second optical transceiver device performs operations identical to those depicted by FIG. 4. However, there are provisions made to allow an optical transceiver module to interoperate with another optical transceiver module that is not capable or configured to perform the adaptive power setting process described herein.

FIGS. 5A and 5B illustrate a flow chart that depicts operations of the adaptive power setting process logic 200 for a particular example in which the characteristic of the optical signals used to communicate receive power is duty cycle of the transmitted optical signals. Reference is also made to FIG. 2 for purposes of this description. In this example, a first value of the duty cycle, e.g., 90%, indicates that the receive power is at or within a predetermined range of the target receive power level, a second value of the duty cycle, e.g., 85% indicates that the receive power is below the target receive power level and a third value of the duty cycle, e.g., 95%, indicates that the receive power is above the target receive power level.

At 222, the startup mode is triggered whenever the optical transceiver module is power cycled or a reset is applied to the module, i.e., first time power up, re-boot, etc. At 224, the controller sets the TX bias current (TX_LVL) to an initial level that corresponds to a power level below the optical transceiver module's receiver damage threshold to prevent damage to the optical transceiver module's receiver if a loopback test is performed. In doing so, the controller also sets the duty cycle of the TX bias current (TX_DC) to an initial value, e.g., 80% to signify the startup mode of operation The controller also sets a constant flag for the TX level (Flag_LVL) to zero; sets a constant called Loop to zero and turns off both the transmit chain circuitry 130 and receive chain circuitry 150. Turning off the transmit chain circuitry 130 and receive chain circuitry 150 may be done by turning off the voltage supplies to these circuits. The transmit chain circuitry 130 is turned off to make sure idle patterns from a host device do not interfere with the adaptive power setting process. The receive chain circuitry 150 is turned off to ensure pulse width (duty cycle) modulation during the adaptive power setting process does not cause interference (such as link flap) to a host device. In other words, since the adaptive power setting process is performed during startup (initial or re-boot) of the optical transceiver module and prior to normal operation (for transmitting and receiving data), the transmit chain circuitry and receive chain circuitry are both shut down while the adaptive power setting process is being performed.

At 226, the controller checks to determine if the TX duty cycle is at a level corresponding to a "final" level for the TX duty cycle. This level is, for example, 90%. A TX duty cycle having the final level (e.g., 90%) means that the optical transceiver module power has sufficient receive power and therefore by transmitting optical signals having 90% duty cycle it informs the partner optical transceiver module that it is receiving sufficient power and that the partner optical transceiver module can lock its transmit power to its current power level. When TX_DC is 90%, the next operation is at 228 where the controller checks Flag_LVL. If Flag_LVL is equal to 1, this means that the RX power at the partner optical transceiver module has reached the target power level and therefore the optical transceiver module can lock to its current TX power level. When TX_DC is at 90% and Flag_LVL is 1 the adaptive power setting adjustment is complete and the next operation at 230 is to set TX duty cycle to 100% for normal operation and at 232 to turn on the transmit chain circuitry 130 and receive chain circuitry 150. After operation 232, the optical transceiver module is ready for link up and normal operations with its partner optical transceiver module at 234.

At 226, if TX_DC is not at 90% or at 228 if Flag_LVL is not 1, the next operation 240 (in FIG. 5B) is to compare the RX power level (RX_LVL) with a predetermined value, X dBm. As long as RX_LVL is not greater than the predefined value of X dBm, the optical transceiver module is kept in the settings defined at operation 224 as shown by the arrow via connector B back to operation 224. Once the RX_LVL goes above X dBm, a transition is made to operation 242 where the Loop constant is incremented by 1. The predefined threshold (RX power level X) can be a value that is close to the lowest power that the receiver can detect.

At 244, the value of Loop is checked. If Loop=1, then a transition is made to operation 246 where the RX duty cycle (RX_DC) for optical signals received from the partner optical transceiver module is determined. When RX_DC is at 100%, this means that the partner optical transceiver module is a conventional transceiver and is not capable of communicating its receive power in order to jointly participate in the adaptive power setting process. Therefore, in operations 248 and 250 the two conditions that satisfy ending the process are set and at 252 the TX power level for the optical transceiver module is set to a common or typical value, e.g., a default power level. The process goes to operation 226 (FIG. 5A) where the final condition for the TX_DC will be met (due to the setting at 248) and the process will end via operations 228-234 as explained above. This part of the process allows the optical transceiver module with adaptive power setting capability to interoperate with a conventional optical transceiver module that is not configured or equipped to perform the adaptive power setting process. By configuring the initial value of TX_DC to be used by a device that is configured to perform the adaptive power setting process to a value that is different than a 100% duty cycle, this allows for a determination of whether a partner optical transceiver is not capable of performing the adaptive process. That is, when an optical transceiver receives a signal with 100% duty cycle (prior to normal operation during the startup/re-boot phase), this is construed to mean that the partner optical transceiver device that transmitted with 100% duty cycle is not capable of performing the adaptive process.

When the result of evaluation made at 246 is negative, then it is confirmed that the partner optical transceiver module is capable of performing the adaptive process and a transition is made to operation 254.

At 244, if Loop is not equal to 1, then the next operation is at 254 to evaluate the duty cycle of optical signals received from the partner optical transceiver module, RX_DC. If at 254 it is determined that RX_DC is at the target level of 90%, this means that the partner optical transceiver module is receiving enough power and therefore Flag_LVL is set to 1 at 256. In other words, when the duty cycle of the received optical signals is at a predetermined value, e.g., 90%, this means that the optical transmitter at the partner optical transceiver module set its transmit duty cycle to that amount because its receive power has achieved the target receive power level or within a predetermined range of the target receive power level. Therefore, when a positive outcome occurs at operation 254, this means that the partner optical transceiver module is receiving sufficient power and the transmit power will be set or locked to the current transmit power value.

At 258, if RX_DC is at 85% this means the RX power of the partner optical transceiver module is below the target level and therefore the TX power should be increased. This is performed at 260 where TX_LVL is increased by a certain amount, e.g., 0.5 dB. At 262, TX_LVL is compared against a maximum transmit level, TX_max, to ensure that TX_LVL does not go beyond a given maximum level. If the TX_LVL exceeds TX_max, then at 264, TX_LVL is set to TX_max, at 266 Flag_LVL is set to 1 and at 267 TX_DC is set to 90%. In other words, if the transmit power level exceeds the maximum power level, the transmit power level is then set to the maximum power level, TX_max.

Operation 268 is reached from a "No" path from operation 258 or from a "No" path from operation 262. At 268, it is determined whether RX_DC is at 95%. When RX_DC is at 95%, this means that the RX power of the partner optical transceiver module is above a target level and therefore the TX power should be reduced. The TX power, TX_LVL, is reduced at 270 by a certain amount, e.g., 0.5 dB. At 272, TX_LVL is compared against a minimum transmit power level, TX_min. TX_min is the lowest TX power level at which the optical transceiver module can still meet all TX specifications except average power and optical modulation amplitude (OMA). Examples of parameters that should be met are eye mask, extinction ratio, dispersion penalty, etc. When TX_LVL is less than or equal to TX_min, then at 274, TX_LVL is set to TX_min, at 276 Flag_LVL is set to 1, and at 277 TX_DC is set to 90%.

Operation 278 can be reached via a "No" path from operation 268 or from a "No" operation from 272. At 278, RX_LVL is compared against the target level and if it is within Y dB (for example, 1 dB) of the target level, this means that the target RX power is achieved and the optical transceiver module needs to communicate this to the partner optical transceiver module. This is done by setting TX_DC to 90% at 280. On the other hand, if RX_LVL is not within the target range then at 282 it is compared to the receive target level. At 284, TX_DC is set to 85% if RX_LVL is below the receive target level; otherwise at 286 TX_DC is set to 95%. After operations 267, 277, 280, 284 and 286, the process transitions back to operation 226 (FIG. 5A) to check if the final or termination conditions are met. This loop of operations repeats until the final termination condition is met (TX_DC=90%).

The adaptive power setting techniques described herein have several advantages over existing fixed power setting schemes. First, these techniques eliminate the chance of failure of optical transceiver modules that have a receiver damage threshold below a maximum transmit power level. Second, these techniques eliminate the need to use attenuators for optical transceivers that have a maximum receiver power below the maximum transmit power. This simplifies initial setup and lowers installation cost.

Third, the optical transceiver module laser transmitter generally operates at a lower power compared to traditional settings and for fiber links with lower loss the laser operates at significantly lower power. This leads to several benefits. Since the laser is operating at lower power, laser life is substantially enhanced and given that lasers generally have the highest probability of failure in optical transceivers, module mean time between failure is significantly improved, resulting in a reduction in network down time. Module power consumption is also reduced since the laser is operating at a lower power.

The adaptive power setting techniques described herein may be in the form of methods as described herein. In addition, these techniques may be in the form of an apparatus and one or more computer readable storage media. In apparatus form, the apparatus comprises an optical receiver configured to receive optical signals from a partner optical transceiver device; an optical transmitter configured to transmit optical signals; transmit bias circuitry configured to supply power bias to the optical transmitter; and a controller configured to supply control signals to the transmit bias circuitry to modulate a characteristic of the optical signals transmitted by the optical transmitter to indicate to the partner optical transceiver device a disparity of the receive power with respect to a target receive power level. The controller is further configured to determine receive power of the received optical signals and a characteristic of the received optical signals based on the electrical signals output by the receive power monitor unit.

In computer readable storage media form, one or more computer readable storage media are encoded with software comprising computer executable instructions and when the software is executed operable to: determine a disparity between receive power of received optical signals at a first optical transceiver from a second optical transceiver device and a target receive power level; and modulate a characteristic of optical signals transmitted by the first optical transceiver device to the second optical transceiver device to indicate to the second optical transceiver device the disparity of the receive power with respect to a target receive power level at the first optical transceiver device.

The above description is intended by way of example only.

What is claimed is:

1. A method comprising:
   receiving optical signals at a first optical transceiver device that are transmitted from a second optical transceiver device;
   determining a receive power of the optical signals received at the first optical transceiver device from the second optical transceiver device; and
   adjusting a duty cycle of pulse width modulated optical signals transmitted by the first optical transceiver device to the second optical transceiver device to one of three values, to indicate to the second optical transceiver device a disparity of the receive power with respect to a target receive power level at the first optical transceiver device,
   wherein adjusting comprises setting the duty cycle of the optical signals transmitted by the first optical transceiver device to a first value of approximately 90% when the receive power is within the predetermined range associated with the target receive power level, a second value of approximately 85% when the receive power is below the predetermined range associated with the target receive power level, and a third value of approximately 95% when the receive power is above the predetermined range associated with the target receive power level.

2. The method of claim 1, and further comprising determining the duty cycle of the optical signals received at the first optical transceiver device from the second optical transceiver device, determining the disparity between the receive power at the second optical transceiver device and the target receive power level based on the duty cycle of the optical signals received at the first optical transceiver device, and adjusting a power level of optical signals transmitted by the first optical transceiver device to the second optical transceiver device based on the duty cycle of the optical signals received at the first optical transceiver device.

3. The method of claim 2, wherein adjusting the power level of optical signals transmitted from the first optical transceiver device comprises increasing the power level when the duty cycle of the received optical signals from the second optical transceiver device has the second value and reducing the power level when the duty cycle of the received optical signals from the second optical transceiver device has the third value.

4. The method of claim 2, and further comprising setting a transmit power level at the first optical transceiver device to a current power level used by the first optical transceiver device when the duty cycle of the received optical signals from the second optical transceiver device has the first value.

5. The method of claim 2, wherein determining the duty cycle of received optical signals at the first optical transceiver device, determining the disparity between the receive power at the second optical transceiver device and the target receive power level, and adjusting the power level are repeated until optical signals are received from the second optical transceiver device having a value for the duty cycle that indicates that the receive power level at the second optical transceiver device is within a predetermined range of the target receive power level.

6. The method of claim 1, and further comprising determining a duty cycle of the optical signals received at the first optical transceiver device from the second optical transceiver device, determining whether the duty cycle of the optical signals received from the second optical transceiver device indicates that the second optical transceiver device is not capable of participating in an adaptive power setting process, and setting a power level to be used by a transmitter of the first optical transceiver device to a default power level.

7. The method of claim 1, wherein receiving, determining and modulating are performed after power up of the first optical transceiver device and prior to normal optical communications with the second optical transceiver device.

8. A method comprising:
 transmitting, by a first optical transceiver device, optical signals to a second optical transceiver device;
 receiving, at the first optical transceiver device, optical signals transmitted from the second optical transceiver device, wherein a duty cycle of the optical signal was adjusted by the second optical transceiver device to one of three values to indicate a disparity of a receive power of the optical signals transmitted to the second optical transceiver device with respect to a target receive power level at the second optical transceiver device;
 evaluating the duty cycle of the optical signals received at the first optical transceiver device from the second optical transceiver device;
 determining the disparity between the receive power at the second optical transceiver device and the target receive power level based on the value of the duty cycle of the optical signals received at the first optical transceiver device, wherein determining the disparity between the receive power at the second optical transceiver device and the target receive power level comprises determining that the duty cycle has a first value of approximately 90% when the receive power is within the predetermined range associated with the target receive power level, a second value of approximately 85% when the receive power is below the predetermined range associated with the target receive power level, and a third value of approximately 95% when the receive power is above the predetermined range associated with the target receive power level; and
 adjusting a power level of optical signals transmitted by the first optical transceiver device to the second optical transceiver device based on the value of the duty cycle of the optical signals received at the first optical transceiver device.

9. The method of claim 8, wherein adjusting the power level of optical signals transmitted from the first optical transceiver device comprises increasing the power level when the duty cycle of the received optical signals from the second optical transceiver device has the second value and reducing the power level when the duty cycle of the received optical signals from the second optical transceiver device has the third value.

10. The method of claim 8, and further comprising setting a transmit power level at the first optical transceiver device to a current power level used by the first optical transceiver device when the duty cycle of the received optical signals from the second optical transceiver device has the first value.

11. An apparatus comprising:
 an optical receiver unit configured to receive optical signals from a partner optical transceiver device;
 an optical transmitter configured to transmit optical signals to the partner optical transceiver device;
 transmit bias circuitry configured to supply power bias to the optical transmitter; and
 a controller configured to supply control signals to the transmit bias circuitry to adjust a duty cycle of the optical signals transmitted by the optical transmitter to one of three values to indicate to the partner optical transceiver device a disparity of the receive power with respect to a target receive power level,
 wherein the controller is configured to set the duty cycle of the optical signals transmitted by the optical transmitter to a first value of approximately 90% when the receive power is within the predetermined range associated with the target receive power level, a second value of approximately 85% when the receive power is below the predetermined range associated with the target receive power level, and a third value of approximately 95% when the receive power is above the predetermined range associated with the target receive power level, and
 wherein the controller is further configured to determine receive power of the received optical signals and the value of the duty cycle of the received optical signals based on electrical signals output by a receive power monitor unit.

12. The apparatus of claim 11, wherein the controller is configured to determine the disparity between the receive power at the partner optical transceiver device and the target receive power level based on the duty cycle of the received optical signals, and supply control signals to the transmit bias circuitry to adjust a power level of optical signals transmitted to the partner optical transceiver device based on the duty cycle of the received optical signals.

13. The apparatus of claim 11, wherein the controller is configured to supply control signals to the transmit bias circuitry to increase the power level when the duty cycle of the received optical signals from the partner optical transceiver device has the second value and to supply control signals to the transmit bias circuitry to reduce the power level when the duty cycle of the received optical signals from the partner optical transceiver device has the third value.

14. The apparatus of claim 11, wherein the controller is configured to set a transmit power level of the transmitter to a current power level when the duty cycle of the received optical signals has the first value.

15. One or more non-transitory computer readable storage media encoded with software comprising computer executable instructions and when the software is executed operable to:
- determine a disparity between receive power of received optical signals at a first optical transceiver from a second optical transceiver device and a target receive power level; and
- adjust a duty cycle of optical signals transmitted by the first optical transceiver device to the second optical transceiver device to one of three values to indicate to the second optical transceiver device the disparity of the receive power with respect to a target receive power level at the first optical transceiver device, wherein the instructions that are operable to adjust comprise instructions that are operable to set the duty cycle of the optical signals transmitted by the first optical transceiver device to a first value of approximately 90% when the receive power is within the predetermined range associated with the target receive power level, a second value of approximately 85% when the receive power is below the predetermined range associated with the target receive power level, and a third value of approximately 95% when the receive power is above the predetermined range associated with the target receive power level.

16. The one or more non-transitory computer readable storage media of claim 15, and further comprising instructions that are operable to determine the disparity between the receive power at the second optical transceiver device and the target receive power level based on the duty cycle of the optical signals received at the first optical transceiver device, and adjust a power level of optical signals transmitted by the first optical transceiver device to the second optical transceiver device based on the duty cycle of the optical signals received at the first optical transceiver device.

* * * * *